Figure 1:
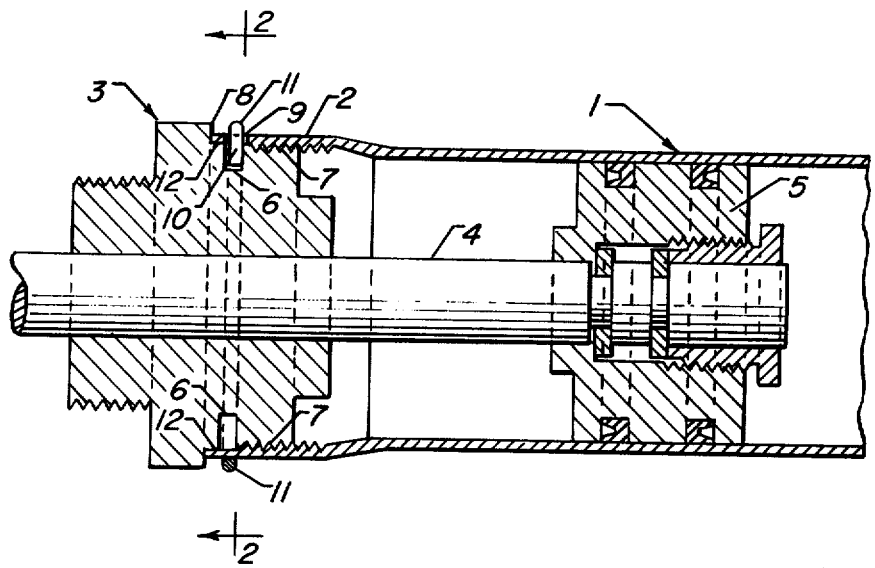

United States Patent [19]
Bimba

[11] 3,881,401
[45] May 6, 1975

[54] FLUID POWER CYLINDER WITH SPRING LOCKING CLIP FOR THREADED END CAP AND BODY CYLINDER

[76] Inventor: Charles W. Bimba, 101 E. Main St., Crete, Ill. 60449

[22] Filed: Oct. 29, 1973

[21] Appl. No.: 410,800

[52] U.S. Cl.................................. 92/169; 151/6
[51] Int. Cl............................................ F16j 11/02
[58] Field of Search........... 92/171, 169, 170; 151/6

[56] References Cited
UNITED STATES PATENTS

| | | | |
|---|---|---|---|
| 1,416,232 | 5/1922 | Osborn | 151/6 |
| 1,617,914 | 2/1927 | Katterjohn | 151/6 |
| 1,809,414 | 6/1931 | Culbertson | 151/6 |
| 2,672,129 | 3/1954 | Fischer | 92/171 |
| 2,742,929 | 4/1956 | Treseder | 92/171 |
| 3,777,627 | 12/1973 | Goade | 92/171 |

Primary Examiner—Paul E. Maslousky
Attorney, Agent, or Firm—Philip T. Liggett

[57] ABSTRACT

In a fluid power cylinder which has jarring from the reciprocating motion of the internal cylinder there is a safety locking arrangement for precluding the unscrewing of the end cap member from the end of the cylindrical body section by having a snap-fitting spring wire clip member extend at least half way around the end of the body section and further have a short pin-like end portion extend into and through a hole in the wall of the body section into a peripheral groove extending around a mid-portion of the threadedly engaged end cap member. A resulting bearing of the side of the pin-like end portion of the spring clip member with a side wall portion of the groove in the cap member precludes the danger of the latter becoming entirely disengaged from the cylinder body section.

3 Claims, 3 Drawing Figures

FLUID POWER CYLINDER WITH SPRING LOCKING CLIP FOR THREADED END CAP AND BODY CYLINDER

The present invention relates to a means for effecting an improved and locked threaded assembly of the end cap and the cylindrical body section of a fluid power motor unit.

More particularly, the present invention provides a spring wire clip member to fit around the end of the cylindrical body section and also have a bent in, pin-like end portion which will extend through a hole in the wall of the body section into a peripheral groove extending around a mid-portion of the end cap member so as to preclude a disengagement of the two latter from the body section.

There is a widespread use of small fluid power units, and particularly small "air cylinders" which use compressed air for their operation, for effecting many types of motions in manufacturing and processing plants. There are also many units which utilize water or other fluid for a hydraulic operation. Many of these units undergo almost continuous operation such that over are subjected to a lot of vibration from their reciprocating pistons. This vibration acting on a threaded assembly can, ovver a period of time, cause the body and end cap portions to come apart. With high pressure air or liquid, a disengagement can also cause a part to be "shot" or projected at a high velocity and be highly dangerous, with a possibility that a worker can be hurt.

It is realized that various types of locking means have been used in connection with threaded connections and also certain locking schemes have been used for fluid power cylinders. For example, lock washers have been tried but are not too successful where a thin walled body section is being used. An "O" ring in a groove to provide friction against the inside wall of the body section is another form of locking means; however, this type of assembly still does not prevent the vibration from loosening the parts. The drilling of a hole through the body section into the threaded section of the end cap for the insertion of a screw or pin member is a satisfactory method from the safety aspect; however, this operation is an additional costly assembly procedure and can cause the problem of getting metal burrs into the threading to cause harm and difficulty during a disassembly.

Thus, it may be considered a principal object of the present invention to provide a locking system which minimizes extra manufacturing and assembly steps in providing for a safe threaded connection between an externally threaded end cap member and internal threading for the end of the cylindrical body section.

Further, it is an object of the present threaded assembly locking system to utilize a continuous peripheral groove in the end cap member which can be cut at the same time as the threading operation to thus obviate any extra handling of such part and, additionally, there is no problem during assembly or reassembly operations in having a hole in a body section line up and match a particular hole, or cross notch, or whatever, in the cap member.

It may be considered a still further object and advantage of the present system to utilize a spring wire member for the locking pin means and for effecting the self-clamping and holding aspect so as to preclude the need of any tool to insert or set a locking member.

In one embodiment, the present invention provides in connection with a fluid power motor unit having a threaded assembly between an end cap member and the cylindrical body section which can become loosened by jarring from the continuous reciprocal motion of the piston member, the improved construction which comprises, having a continuous peripheral narrow groove around the mid-portion of the end cap member at a position closely adjacent the termination of external threading on the interior end portion of such cap member, having internal threading on the end portion of the body section which engages said threaded cap member, further having a small hole through the wall of said body section at a location near the end thereof for alignment with said peripheral groove in said cap member when the body section is tightly engaged over the latter, and a spring wire clip member sized and shaped to snap-fit around said cylindrical body section for more than 180° and also have a short inwardly bent pin-like portion that fits through said hole in the wall of the body section and into said groove of said cap member, whereby the latter cannot become disengaged from said body section.

Typically, the spring wire member may be made of relatively small diameter material such as of the order of about 1/32 to 1/16 inch; however, the pin-like portion which extends into the groove on the end cap member shall, of course, have sufficient strength, for both bending and shear stressing, so as to preclude disengagement of the assembled parts. In other words, in the locking operation the bent-in, pin-like portion of the spring wire clip member will be forced to bear along the side wall portion of the groove and resist further loosening or unscrewing of the assembled parts.

It may also be noted that a preferred construction and arrangement provides that a shoulder is formed on the end cap member so as to provide a stop for the end of the cylindrical body section when it is screwed and assembled over the cap member. Such shoulder, or abutment wall section, will be at a predetermined distance from the groove in the cap member such that by having the hole placed through the wall of the end portion of the body section at approximately the same distance, there will be an alignment between the hole in the wall of the body and the groove in the cap member after their complete assembly.

It is not intended to limit the body portions of the fluid power unit to any one type of material, or types of material, inasmuch as the body sections may be made of hard cold rolled steel or of stainless steel, etc., and end cap members may be made of steel, brass, aluminum, etc., and be readily usable in combination with a cylindrical form body section. It is, however, necessary that the spring wire clip member be formed from suitable spring wire in order that there will be a self-clamping and holding of the clip member around the body section as long as the clip member is of a length to extend at least 180° or more around the body section after having its short, pin-like portion inserted into the body section opening and the end cap groove.

Reference to the accompanying drawing and the following description thereof will serve to illustrate one embodiment of the present invention as well as set forth certain advantages that may be obtained in connection therewith.

FIG. 1 of the drawing is a partial sectional view through an end portion of a fluid member power unit indicating a locked threaded assembly of the body section and an end cap member.

Figure 2:
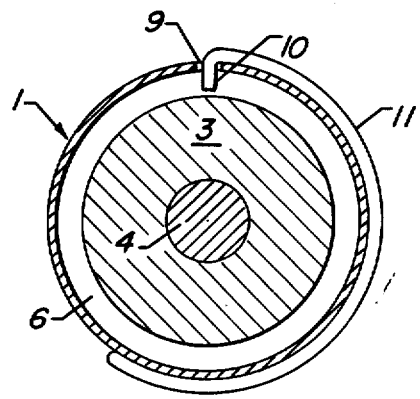

FIG. 2 of the drawing is a cross-sectional view through the assembly in accordance with the line 2—2 in FIG. 1.

Figure 3:
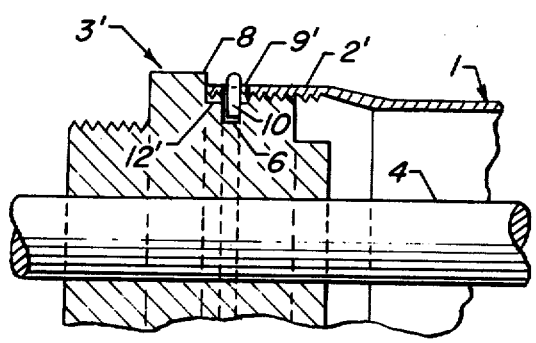

FIG. 3 of the drawing is a partial longitudinal sectional view indicating a variation in the construction of the end portion of the body section, with the latter being entirely threaded to the outer extremity thereof.

Referring now particularly to FIGS. 1 and 2 of the drawing, there is indicated a cylindrical form body section 1 with a slightly larger diameter and interiorly threaded end portion 2 that has its threading sized to engage external threading on an end member 3. In addition, there is indicated diagrammatically a portion of a piston rod member 4 and the assembly of the internal end portion thereof with a piston member 5.

In the present embodiment, and in accordance with the present invention, there is a groove 6 which extends entirely around the circumference of cap member 3 at a location closely adjacent the threaded section 7 on the internal end portion of cap member 3. There is also indicated an off-set or shoulder 8 around the external periphery of end cap 3 which will serve as a stop for the end of the cylindrical body section 1. Such shoulder is preferably at a short spaced distance beyond the groove 6, but such as to permit a portion of the body member 1 to pass well beyond groove 6. The short distance further permits a hole 9 through body section 1 to be spaced from its end section and still be in alignment with groove 6 in cap member 3. The hole 9 together with groove 6 further permits, in accordance with the present invention, the insertion of a bent down pin-like portion 10 from a spring wire clip member 11 to serve as a locking pin to preclude the disengagement of body section 1 from end cap member 3. As best shown in FIG. 2 of the drawing, the full length of spring clip member 11 is to be at least greater than 180° around body section 1 such that it can provide its own clamping action therearound. It will also be noted that the bent down pin-like portion 10 passing through the hole 9 into the fully circumferential groove 6 will have sufficient length to be able to bear against a wall portion of groove 6 in order to provide the desire "locking" of the cap to the body section. In the event that it is desired to disengage the parts of the fluid power cylinder, then clip member 11 can be lifted up by a screwdriver or other suitable prying means such that portion 10 would be pulled out of the hole 9 and the groove means 6 to in turn permit the unscrewing of one section with respect to the other.

As heretofore noted, during long extended periods of operation for a fluid power motor unit, there is the constant vibration from the reciprocating movement of the piston member and the piston rod which can lead to the loosening of a normal threaded engagement and in the event there is a total disengagement, there can be the danger of a nearby person being hurt. However, with the use of the pin member 100 from clip 11, there is a resulting bearing or contact between the side of the pin portion 10 and the side of the groove 6 so as to stop any disengagement between a body and an end cap section, even though there may be a slight rotation and loosening between the engaged members. The only way that there can be the vibrated disengagement of parts would be in the event that the pin portion 10 is sheared or otherwise broken from the main body portion of the clip member 11. However, as heretofore noted, the spring wire forming clip member 11 and bent portion 10 shall be of sufficient diameter to have adequate strength to preclude strength to preclude excessive bending or a "shearing-off" during operation condition.

It will be noted in the embodiment of FIG. 1, that an internal end portion at body section 1 is free of threads such that the hole 9 is through a thin wall section having no threading and extending over a flat wall portion 12 of cap member 3. However, by lessening the diameter of the cap member at the section 12, there may be threading to the end of the body section 1 that can pass over groove 6 in the cap member. For example, as best shown in FIG. 3 of the drawing, there is an embodiment where the internally threaded end portion 2' of body section 1 is fully threaded to the end thereof and has a hole 9' which extends through the threading. Also, in order to accommodate the threading on the body section, there will preferably be a further reduction in diameter for end cap member 3' at section 12' so as to permit space for the internal threads. Thus, threading can continue on beyond groove means 6 to the end of body section 1 and to the shoulder portion 8. In each case, however, the hole 9 or 9' for body section 1 will be at predetermined spaced distance from the end of the latter such that it will be in alignment with groove 6 after the full engagement of cap member 3 and body 1 whereby pin portion 10 of clip member 11 may pass through the body section and rest within the groove 6 of the cap member.

The groove 6 may be slightly larger than the diameter of the spring wire utilized in clip member 11 and for pin portion 10 in order that their may be some play or tolerance to insure easy assembly of parts; however, preferably the groove will be only slightly larger than the wire diameter in order to preclude any great amount of unscrewing or disengaging movement between the assembled parts before there is a bearing of the pin portion 10 against the side wall portion of groove 6 and the desired stopping of any further disengaging between parts during operation conditions. As heretofore noted, it is a particular advantage of the present assembly system to have a locking member that can be placed over the assembled parts without having to have last minute drilling or fitting operations. In other words, the pin portion 10 will fit into a circumferential groove at any point and there is no necessity to have alignment of holes or transverse slots with respect to a hole in the body member after a tight assembly between the body section with the cap member. Also, the grooving of the cap member is readily accomplished as a part of the treading operation without any extra handling step of such section during the fabrication of parts, while the hole 9 can be rapidly drilled or punched within the end of the body section 1 by placement in a suitable jig or spacing device during the handling of this section for the threading and prior to the assembly of parts.

I claim as my invention:

1. In a fluid power motor unit having a cylindrical body section, a removable end cap for at least one end thereof, a movable piston member in the body section, a piston rod connected to the piston member, and fluid inlet-outlet means to the interior of the body section to receive and discharge a pressurized fluid stream which gives motion to the piston member and there is a threaded assembly between said removable end cap member and the cylindrical body section which can become loosed from each other by jarring from the motion of the piston member, the improved construction and assembly which comprises, having a continuous peripheral relatively narrow and deep groove that is around the mid-portion of the end cap member at a position closely adjacent the termination of external threading provided on the interior end portion of such cap member, a raised shoulder around the exterior of said cap member and positioned beyond said groove and toward the outer portion of the cap member with respect to the interior termination of the threading thereon, having internal threading on the end portion of the body section which engages said external threading on said cap member and encompasses the interior end portion thereof to the point of contact of the end of the body section with said raised shoulder whereby the narrow groove is totally covered by the body section, further having a small hole through the wall of said body section at a location near the end thereof and in alignment with said peripheral groove in said cap member when the body section is tightly engaged over the latter, and a greater than 180° spring wire clip member sized and shaped to snap-fit around said cylindrical body section and also have a short inwardly bent pin-like portion that is sized to fit through said hole in the wall of the latter and also sized to fit into and be only slightly smaller than said narrow peripheral groove in said cap member, whereby the latter will be held from disengagement with said body section.

2. The fluid power motor unit of claim 1 further characterized in that the peripheral narrow groove in said end cap member has a straight wall portion for at least in that portion which is next adjacent the threading for the cylindrical body section such that there is a straight wall for an abutting contact with said pin-like portion of said spring wire clip member to provide good bearing contact therebetween and to preclude disengagement of the assembled parts.

3. The fluid power motor of claim 1 further characterized in that the internal threading on the end portion of body section which engages said threaded cap member is spaced a short distance from the end of said body section such that there are no threads over said peripheral groove and said hole in the wall of the body section is through a non-threaded portion thereof.

* * * * *